(12) United States Patent
Berger (10) Patent No.: US 8,863,366 B2
(45) Date of Patent: Oct. 21, 2014

(54) METHOD OF CONVERTING A NON-RECHARGEABLE FLASHLIGHT TO A RECHARGEABLE FLASHLIGHT

(76) Inventor: Karl Hermann Berger, Clifton Beach (AU)

( * ) Notice: Subject to any disclaimer, the term of this patent is extended or adjusted under 35 U.S.C. 154(b) by 68 days.

(21) Appl. No.: 13/581,684

(22) PCT Filed: May 18, 2011

(86) PCT No.: PCT/AU2011/000582
§ 371 (c)(1),
(2), (4) Date: Aug. 29, 2012

(87) PCT Pub. No.: WO2011/143704
PCT Pub. Date: Nov. 24, 2011

(65) Prior Publication Data
US 2012/0317770 A1    Dec. 20, 2012

(51) Int. Cl.
| | | |
|---|---|---|
| B21K 21/16 | (2006.01) | |
| H02J 7/00 | (2006.01) | |
| F21L 4/08 | (2006.01) | |
| F21V 17/00 | (2006.01) | |
| F21V 23/06 | (2006.01) | |
| F21V 23/00 | (2006.01) | |
| F21L 4/00 | (2006.01) | |

(52) U.S. Cl.
CPC ............... *F21L 4/085* (2013.01); *H02J 7/0044* (2013.01); *F21V 17/002* (2013.01); *F21V 23/06* (2013.01); *F21V 23/007* (2013.01); *F21L 4/005* (2013.01)

USPC .................... 29/401.1; 362/183; 320/115

(58) Field of Classification Search
CPC ....... H02J 7/0044; H02J 7/0042; F21V 23/06; F21V 4/085; F21V 23/007; F21V 17/002; F21L 4/005; B23P 23/00
USPC ........... 29/401.1; 362/183, 269; 320/115, 113
See application file for complete search history.

(56) References Cited

U.S. PATENT DOCUMENTS

| | | | | |
|---|---|---|---|---|
| 3,938,018 | A * | 2/1976 | Dahl | 320/140 |
| 4,092,580 | A * | 5/1978 | Prinsze | 320/115 |
| 4,357,648 | A * | 11/1982 | Nelson | 362/183 |
| 6,296,367 | B1 | 10/2001 | Parsons et al. | |
| 2002/0149344 | A1* | 10/2002 | Harvey | 320/132 |
| 2002/0158605 | A1 | 10/2002 | Sharrah et al. | |

* cited by examiner

*Primary Examiner* — David Bryant
*Assistant Examiner* — Ruth G Hidalgo-Hernande
(74) *Attorney, Agent, or Firm* — David A. Guerra (57) ABSTRACT

A method for converting a non-rechargeable flashlight to a rechargeable flashlight (100) enables economical and environmentally friendly retrofitting of non-rechargeable flashlights. The method includes removing an original tail cap from the flashlight (100); placing a rechargeable battery (300) into a housing (110) of the flashlight (100); and replacing the original tail cap with a replacement tail cap (305), wherein the replacement tail cap (305) comprises circuitry (320) for receiving electrical power from a recharging base station for recharging the rechargeable battery (300).

15 Claims, 8 Drawing Sheets

FIG. 9

METHOD OF CONVERTING A NON-RECHARGEABLE FLASHLIGHT TO A RECHARGEABLE FLASHLIGHT

FIELD OF THE DISCLOSURE

The present invention relates generally to flashlights, and in particular to a method of converting a conventional non-rechargeable flashlight to a rechargeable flashlight that can be recharged using a base station.

BACKGROUND

Commercially available flashlights marketed today employ various battery technologies that can be broadly classified as rechargeable and non-rechargeable. Examples of non-rechargeable battery technologies include cells based on alkaline, lithium, zinc-carbon, and zinc chloride. Examples of rechargeable battery technologies include cells based on lead acid, lithium ion, lithium sulfur, lithium titanate, nickel cadmium, nickel iron, nickel hydrogen, nickel metal hydride, nickel zinc, and polysulfide bromide. Rechargeable battery technologies are generally more environmentally friendly than non-rechargeable battery technologies, as once drained non-rechargeable batteries add to land fill waste and can potentially contaminate soil and water supplies.

Flashlights sold today with non-rechargeable batteries can be outfitted with rechargeable batteries by the user. For example a user may purchase a flashlight with an alkaline based battery technology and replace the batteries with rechargeable battery cells made of nickel metal hydride. Furthermore some manufacturers have offered flashlights bundled with rechargeable batteries.

However, in order to recharge such rechargeable batteries, the users must remove the batteries from the flashlight and set the batteries in a separate charging apparatus. This can be cumbersome and time consuming, and leaves the flashlight inoperable until the batteries are replaced and the flashlight is reassembled.

Manufacturers have therefore recognized a need for recharging flashlight batteries without removing the batteries from a flashlight. For example, manufacturers have designed flashlights that are sold with a base station that can recharge a flashlight when the flashlight is simply deposited in the base station, and without requiring removal of the batteries from the flashlight. Such flashlights are therefore readily usable, even during a charging phase, by simply lifting the flashlight out of the base station and turning the flashlight on.

Many such base stations recharge the battery pack using metallic conductive contact points between the base station, which is plugged into an AC circuit, and the flashlight. Other manufacturers of rechargeable flashlights use inductive charging stations. Inductive charging uses electromagnetic induction, whereby a charger induces a current inside the flashlight which transfers electric power to the batteries. An induction coil in the charger (primary coil) creates an alternating electromagnetic field, and a second induction coil (secondary coil) in the flashlight takes power from the electromagnetic field and converts it back to electrical current to charge the batteries. Essentially two induction coils in close proximity combine to form an electrical transformer.

One example of inductive charging is described in U.S. Pat. No. 3,938,018 to Dahl, where "[a] normal 117-volt, 60 cycle source is converted into a high frequency signal resulting in radiation of a substantial portion of the energy in the signal. A receiving coil is inductively coupled to the radiation over a given distance substantially less than a wave length of the high frequency signal to provide a received signal without the necessity of any electrical wires. The received signal in turn is converted into a D.C. signal and passed to a rechargeable battery for charging. The inductive coupling can be utilized for recharging portable electrical instruments having rechargeable batteries or for charging larger rechargeable batteries such as used in electrically driven vehicles." Thus a flashlight outfitted with such technology does not require external electrical contacts between a base station and the flashlight.

However, commercially available rechargeable flashlights that include a recharging base station are generally more expensive than comparable non-rechargeable flashlights. For example, the Maglite® (a registered trademark of Mag Instrument, Inc.) brand rechargeable flashlights manufactured by Mag Instrument, Inc. generally retail at significantly higher prices than the Maglite® brand non-rechargeable flashlights.

There is therefore a need for an improved method of converting a non-rechargeable flashlight to a rechargeable flashlight.

SUMMARY OF THE INVENTION

According to one aspect, the invention is a method for converting a non-rechargeable flashlight to a rechargeable flashlight, the method comprising: removing an original tail cap from the flashlight; placing a rechargeable battery into a housing of the flashlight; and replacing the original tail cap with a replacement tail cap, wherein the replacement tail cap comprises circuitry for receiving electrical power from a recharging base station for recharging the rechargeable battery.

Optionally, the circuitry for receiving electrical power from a recharging base station comprises a secondary coil for receiving inductive power from a primary coil in the recharging base station.

Optionally, the circuitry for receiving electrical power from a recharging base station comprises external electrical contacts for establishing an electrical connection with corresponding external electrical contacts of the recharging base station.

Optionally, the non-rechargeable flashlight is a Maglite® brand flashlight manufactured by Mag Instrument, Inc.

Optionally, an external shape and configuration of the replacement tail cap is approximately the same as an external shape and configuration of the original tail cap.

Optionally, the rechargeable battery comprises a battery technology selected from the following: lead acid, lithium ion, lithium sulfur, lithium titanate, nickel cadmium, nickel iron, nickel hydrogen, nickel metal hydride, nickel zinc, and polysulfide bromide.

Optionally, the rechargeable battery comprises an integrated voltage converter.

Optionally, the replacement tail cap includes a jack-type coupling for electrically connecting the replacement tail cap to the rechargeable battery.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. The apparatus and method components have been represented to show only those specific details that are pertinent to understanding the embodiments of the present invention, so as not to obscure the disclosure with details that will be readily apparent to those of ordinary skill in the art having the benefit of the description herein.

DETAILED DESCRIPTION

According to some embodiments of the present invention, a method enables converting a non-rechargeable flashlight to a rechargeable flashlight. The method includes removing an original tail cap from the flashlight; placing a rechargeable battery into a housing of the flashlight; and replacing the original tail cap with a replacement tail cap, wherein the replacement tail cap comprises circuitry for receiving electrical power from a recharging base station for recharging the rechargeable battery. Embodiments of the present invention thus enable more efficient, economical, and environmentally friendly use of non-rechargeable flashlights such as non-rechargeable Maglite® brand flashlights.

In this patent specification, adjectives such as first and second, upper and lower, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

Figure 1:
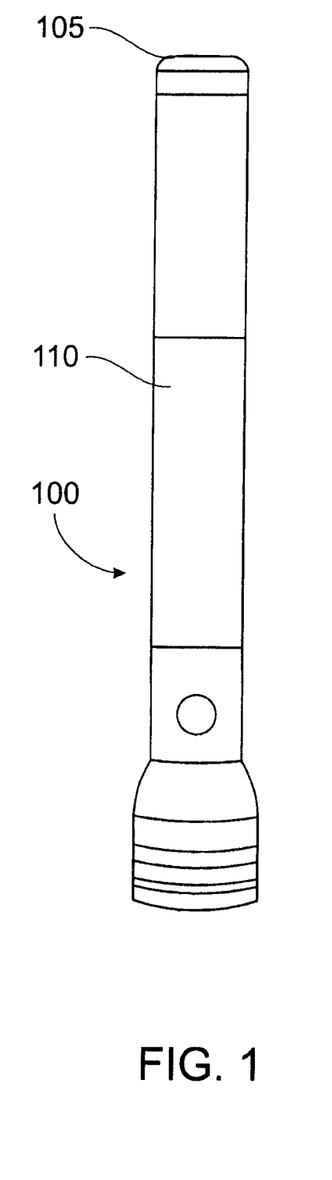
FIG. 1 is a side view of a non-rechargeable Maglite® brand flashlight, according to the prior art.

FIG. 1 is a side view of a non-rechargeable Maglite® brand flashlight 100, according to the prior art. As shown, the flashlight 100 includes an original tail cap 105 that can be unscrewed from a housing 110 of the flashlight 100.

Figure 2:
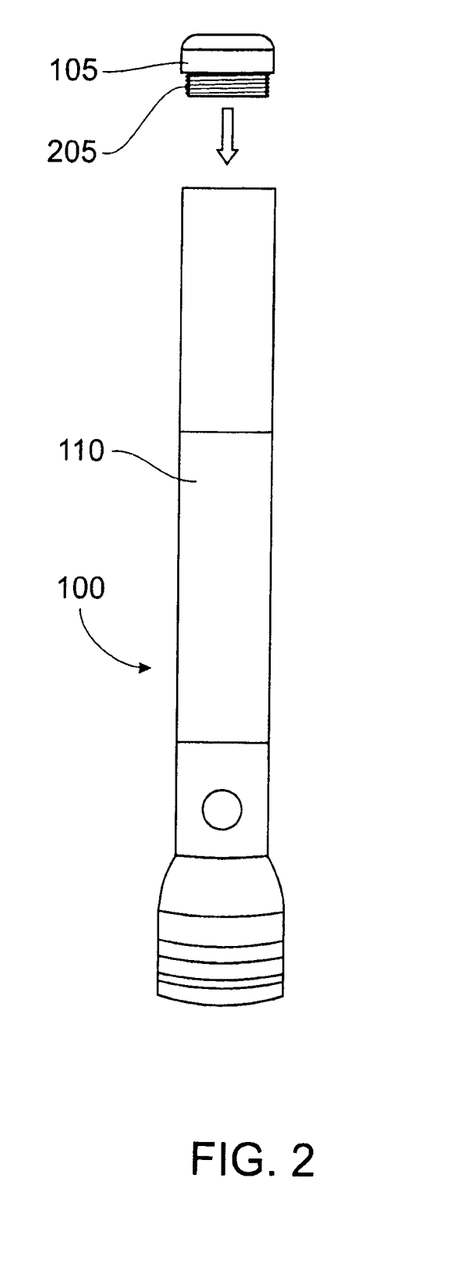
FIG. 2 is a side view of a non-rechargeable Maglite® brand flashlight, showing the original tail cap removed, according to the prior art.

FIG. 2 is a further side view of the non-rechargeable Maglite® brand flashlight 100, showing the original tail cap 105 removed, according to the prior art. External threads 205 on the original tail cap 105 are used to secure the tail cap 105 to the housing 110.

Figure 3:
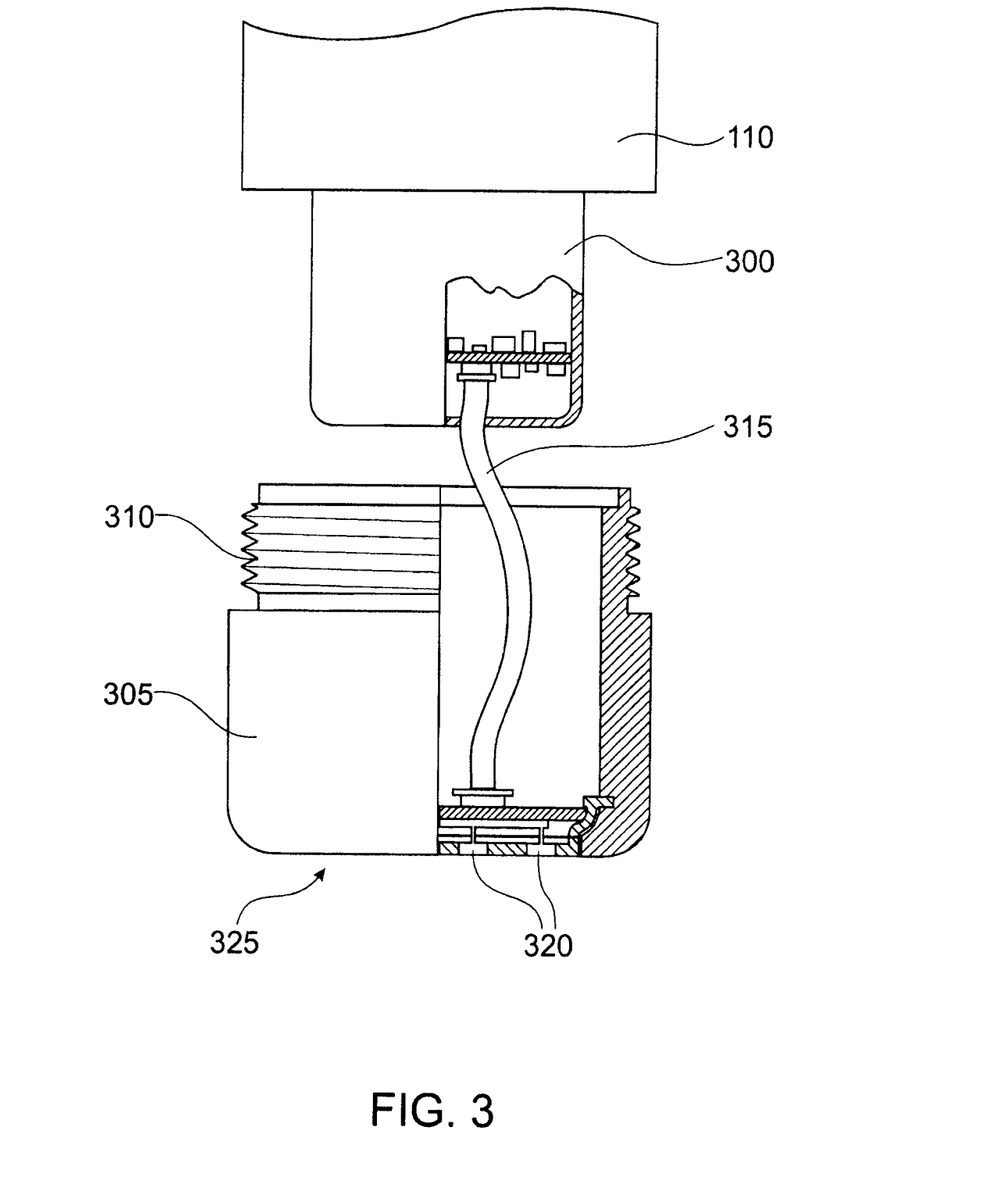
FIG. 3 is a close up partial cutaway side view of a rechargeable battery located in a non-rechargeable Maglite® brand flashlight housing and connected to a replacement tail cap, according to an embodiment of the present invention.

FIG. 3 is a close up partial cutaway side view of a rechargeable battery 300 located in the housing 110 of the non-rechargeable Maglite® brand flashlight 100 and connected to a replacement tail cap 305, according to an embodiment of the present invention. As shown, the external shape and configuration of the replacement tail cap 305 is approximately the same as the external shape and configuration of the original tail cap 105. External threads 310 have a pitch, diameter and size that match the pitch, diameter and size of the external threads 205 of the original tail cap 105. After the original tail cap 105 is removed, the external threads 310 enable the replacement tail cap 305 to be easily threaded into the corresponding internal threads (not shown) of the housing 110. A spring (not shown) may be installed between the battery 300 and the tail cap 305 to securely hold the battery 300 in place when the tail cap 305 is threaded onto the housing 110. As will be understood by those having ordinary skill in the art, the replacement tail cap 305 can be manufactured of various materials such as aluminum, steel, metal alloys, composites, or polymer materials.

A wire 315 provides an electrical connection between the rechargeable battery 300 and external electrical contacts 320 on an end 325 of the replacement tail cap 305. As described in further detail below, when the flashlight 100, with the replacement tail cap 305 installed, is placed in a recharging base station the external electrical contacts 320 touch corresponding external contacts on the base station. That enables power from the base station to be delivered to the rechargeable battery 300 to recharge the battery 300.

Figure 4:
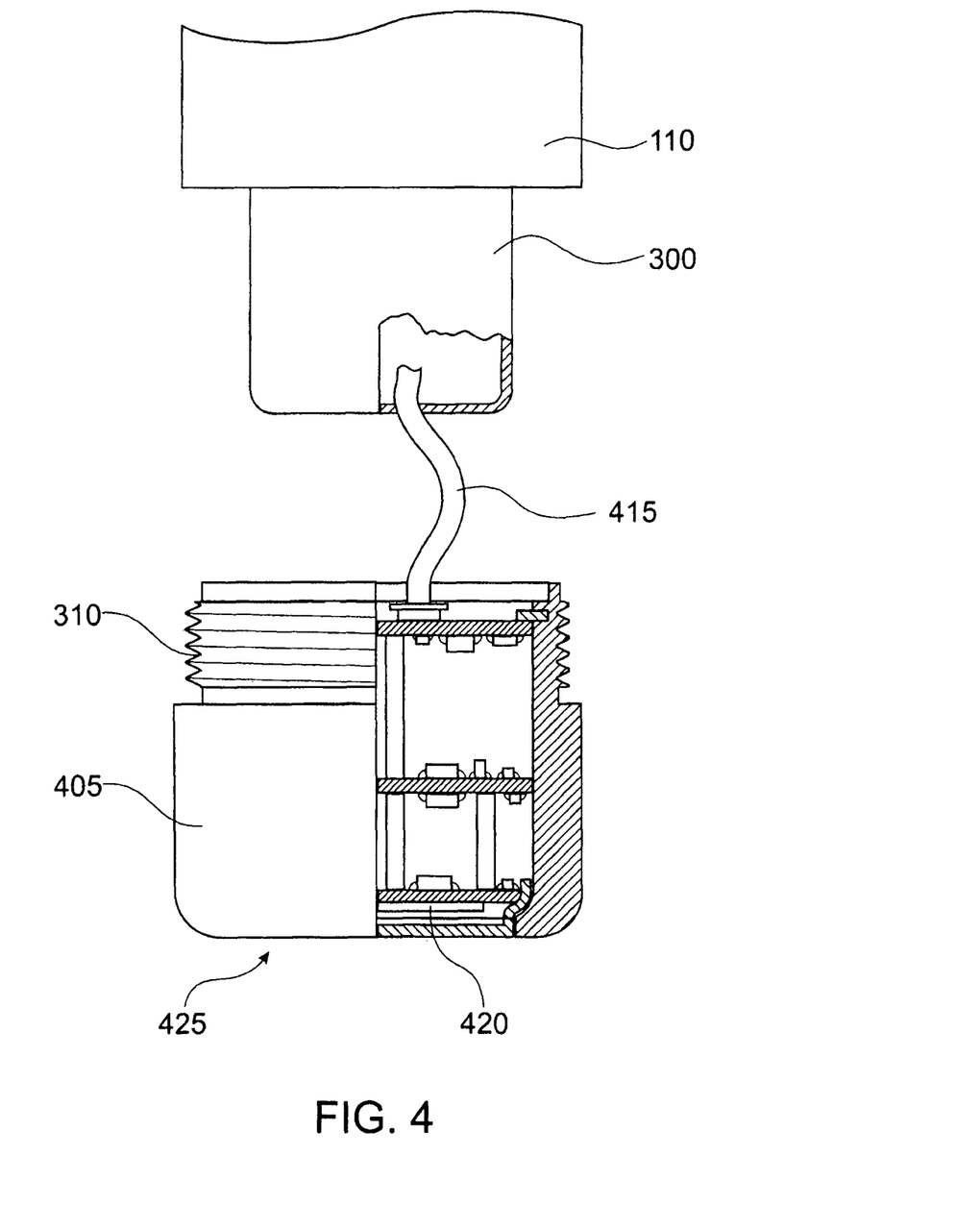
FIG. 4 is a close up partial cutaway side view of a rechargeable battery located in a non-rechargeable Maglite® brand flashlight housing and connected to a replacement tail cap, according to an alternative embodiment of the present invention.

FIG. 4 is a close up partial cutaway side view of a rechargeable battery 300 located in the housing 110 of the non-rechargeable Maglite® brand flashlight 100 and connected to a replacement tail cap 405, according to an alternative embodiment of the present invention. A wire 415 provides an electrical connection between the rechargeable battery 300 and an internal secondary coil 420 located near an end 425 of the replacement tail cap 405.

As described in further detail below, when the flashlight 100, with the replacement tail cap 405 installed, is placed in a recharging base station the internal secondary coil 420 is adjacent a corresponding primary coil of the base station. That enables power from the base station to be inductively delivered to the rechargeable battery 300 to recharge the battery 300.

Also, according to alternative embodiments the battery 300 can be shaped as a dummy housing to simulate the end to end size of 2, 3, 4 or more D-cell batteries, according to the length of the flashlight housing 110. By incorporating an integrated voltage converter into the battery 300, the latest in battery technology always can be employed without the need to entirely replace the non-rechargeable Maglite® brand flashlight 100. For example, long cycle life lithium ion LiFePO4 batteries, which can be recharged thousands of times, can require voltage conversion to conform to the voltage requirements of a particular flashlight bulb. However, use of such batteries can be very desirable as they can significantly reduce the overall weight of a retrofitted flashlight.

Figure 5:
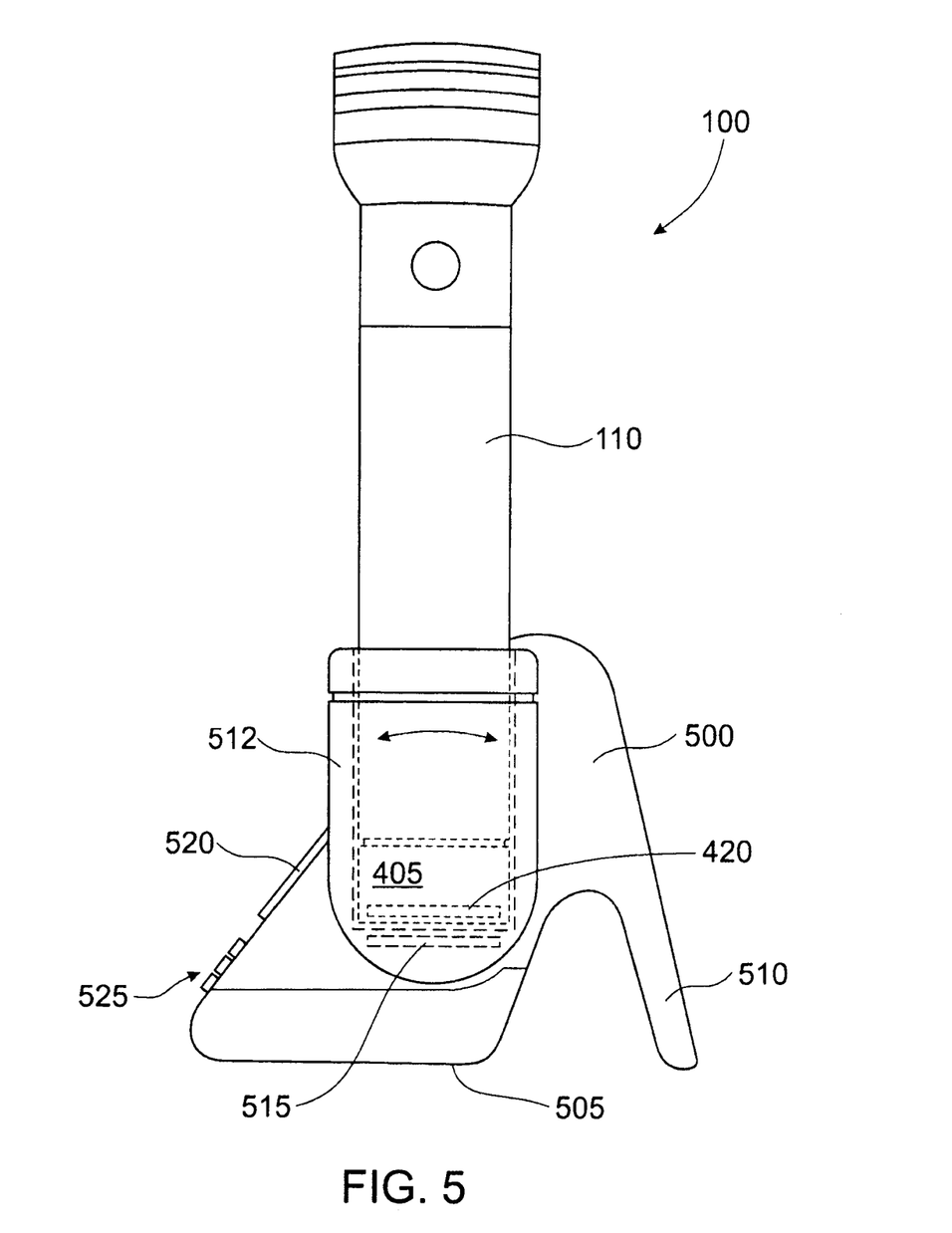
FIG. 5 is a side view of a non-rechargeable Maglite® brand flashlight fitted with a rechargeable battery and a replacement tail cap, and positioned in a recharging base station, according to an embodiment of the present invention.

FIG. 5 is a side view of the non-rechargeable Maglite® brand flashlight 100 fitted with the rechargeable battery 300 and the replacement tail cap 405, and positioned in a recharging base station 500, according to an embodiment of the present invention. The base station 500 is designed with a flat bottom 505 and a support leg 510 that can rest on top of a flat surface such as a table or floor. A cylindrical receptacle 512 receives the tail cap 405 and a lower end of the housing 110 of the flashlight 100. The receptacle 512 thus supports the flashlight 100 in a vertical orientation and ensures that the secondary coil 420 is held adjacent to a primary coil 515 located in the base station 500. Other features of the base station 500 may include, for example, a display screen 520 and operating buttons 525. The base station 500 is thus similar to the well known and commercially available base stations used for inductively charging various electrical and electronic devices such as toothbrushes and mobile telephones.

Advantageously, when installed in the base station 500, the flashlight 100 remains readily usable, even during a charging phase, as the flashlight 100 can be used quickly by simply lifting the flashlight 100 out of the base station 500 and turning the flashlight on.

As will be understood by those having ordinary skill in the art, a similar base station can be configured with contacts points that replace the primary coil 515 of the base station 500, and enable the similar base station to charge the battery 300 using external electrical contacts 320 of the tail cap 305. Alternatively, the base station 500 and replacement tail cap 405 also can be modified to various designs to enable effective inductive charging. For example, the secondary coil 420 and tail cap 405 can be modified so that a secondary coil surrounds the sides of a hole in the end 425. The primary coil 515 and base station 500 are then modified so that a primary coil extends into a protrusion from the base station. During charging, the protrusion extends into the hole to facilitate an effective inductive electrical coupling.

Other features of the base station 500 are not illustrated or described herein as they will be readily understood in light of the present description by those having ordinary skill in the art. For example, such features include alternating current (AC) power sources that plug into a conventional 110V or 240V power outlet, power regulating devices, and charging circuitry.

The concepts of the present invention may be readily utilized for flashlights using numerous battery sizes including "D", "C", "AA" and "AAA". It is also contemplated that a base station of the present invention can be used both in a free standing table configuration and in a wall mounted configuration. For this purpose a cylindrical receptacle which receives the flashlight 100, such as the receptacle 512, can be adjustable to rotate on an axis up and downward so that the flashlight 100 always remains in a vertical position.

Figure 6:
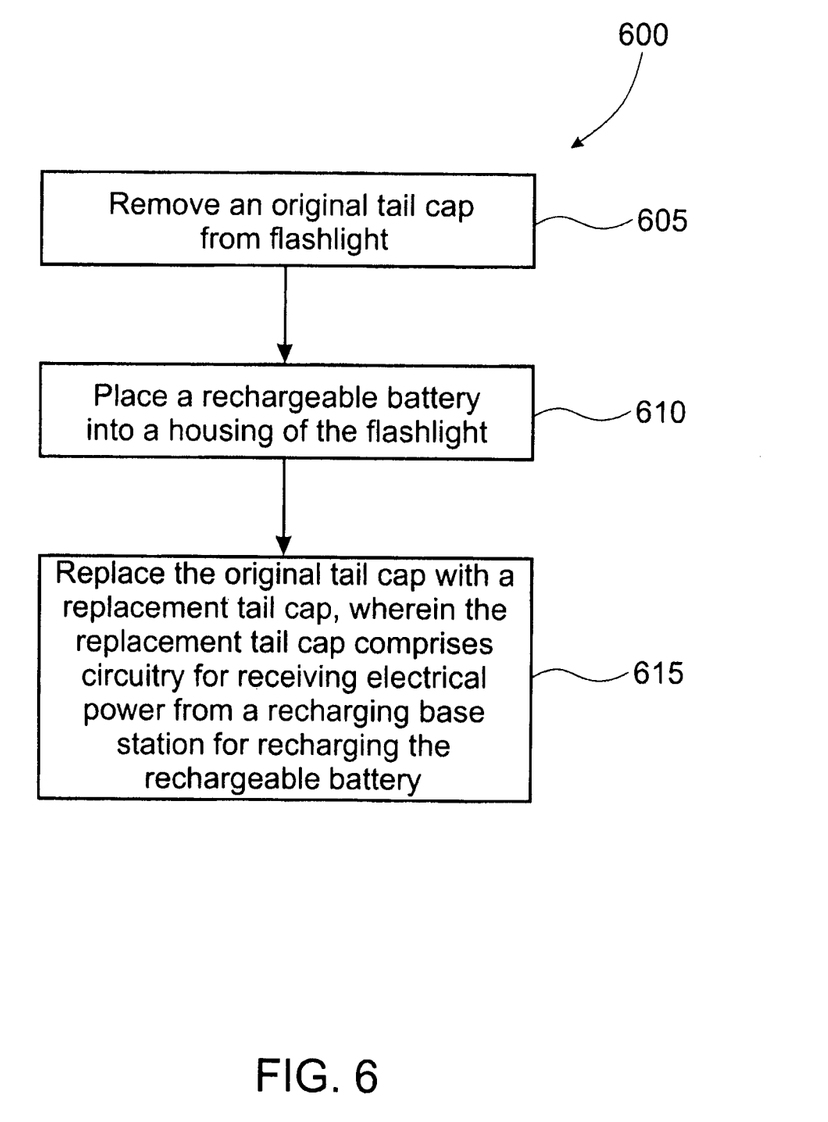
FIG. 6 is a flow diagram illustrating a method for converting a non-rechargeable flashlight to a rechargeable flashlight, according to an embodiment of the present invention.

FIG. 6 is a flow diagram illustrating a method 600 for converting a non-rechargeable flashlight to a rechargeable flashlight, according to an embodiment of the present invention. At step 605, an original tail cap is removed from the flashlight. For example, the original tail cap 105 is unscrewed from the non-rechargeable Maglite® brand flashlight 100.

At step 610, a rechargeable battery is placed into a housing of the flashlight. For example the rechargeable battery 300 is placed into the housing 110 of the flashlight 100.

At step 615, the original tail cap is replaced with a replacement tail cap, wherein the replacement tail cap comprises circuitry for receiving electrical power from a recharging base station for recharging the rechargeable battery. For example, the original tail cap 105 is replaced with one of the replaceable tail caps 305 or 405 and threaded onto the housing 110 of the flashlight 100.

Replacement tail caps such as the tail caps 305, 405, and base stations such as the base station 500, can be sold separately from flashlights such as the non-rechargeable Maglite® brand flashlight 100. That enables owners of non-rechargeable flashlights to easily and economically retrofit and convert a non-rechargeable flashlight to a more environmentally friendly rechargeable flashlight.

Figure 7:
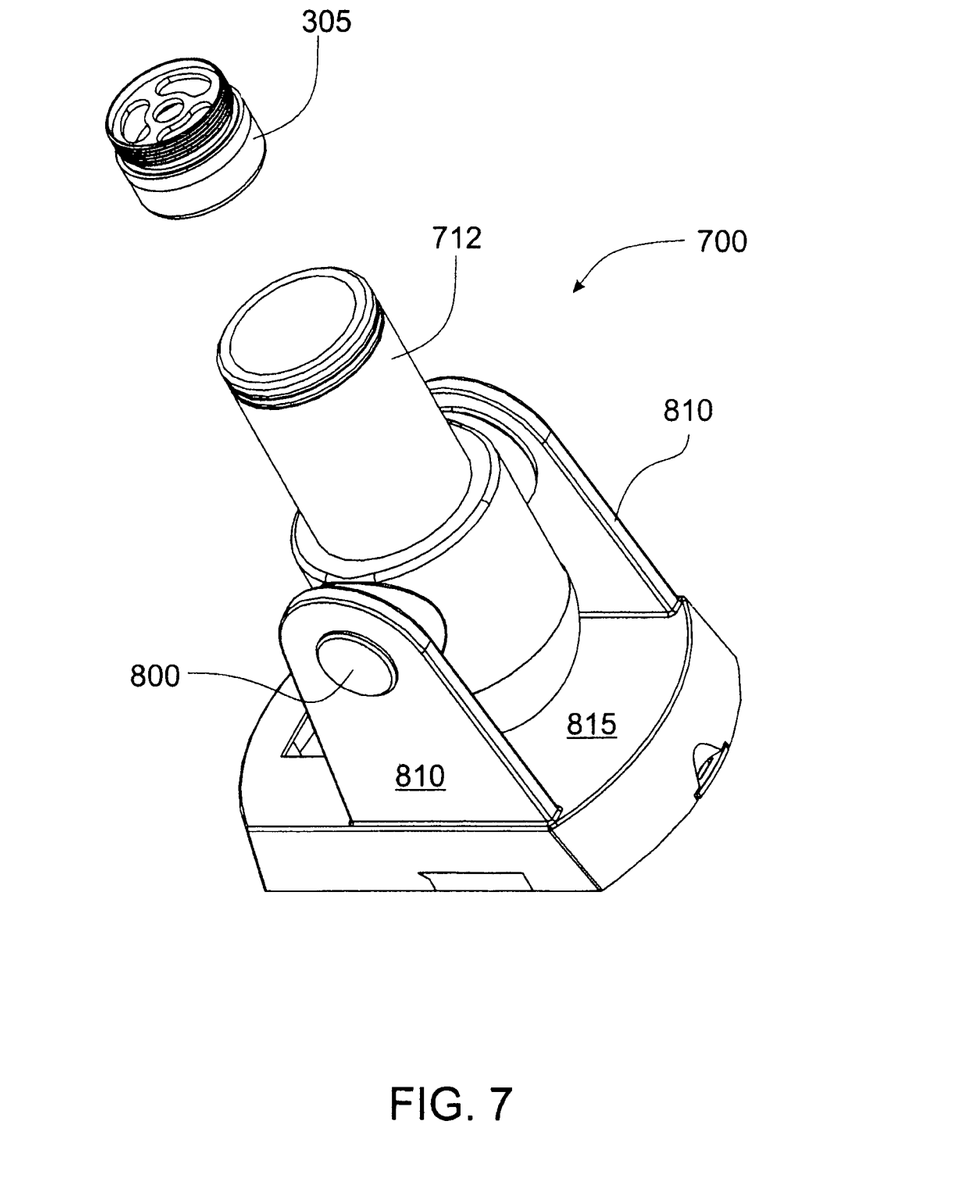
FIG. 7 is a perspective view of a recharging base station, according to an alternative embodiment of the present invention.

FIG. 7 is a perspective view of a recharging base station 700 according to an alternative embodiment of the present invention. A cylindrical receptacle 712 receives a tail cap; such as the tail cap 305 or 405, when threaded onto the housing 110 of the flashlight 100. Similar to the recharging base station 500, the base station 700 enables the flashlight 100 to remain readily usable, even during a charging phase, as the flashlight 100 can be used quickly by simply lifting the flashlight 100 out of the base station 700 and turning the flashlight on.

Figure 8:
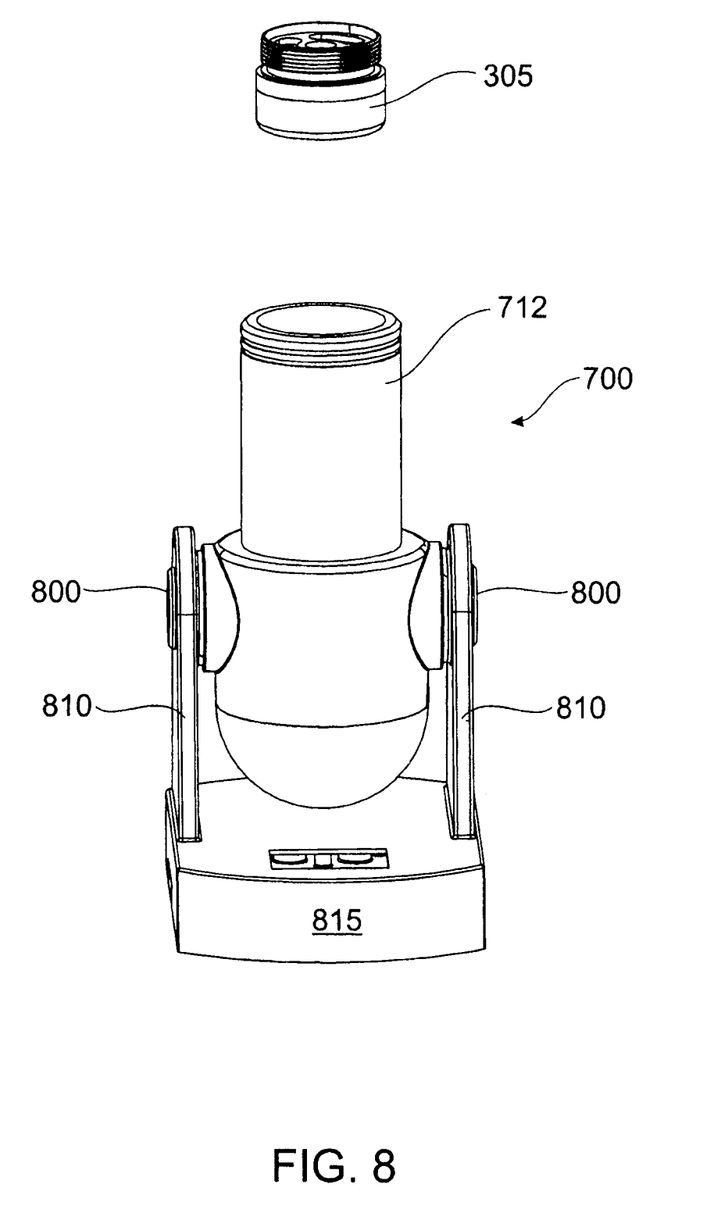
FIG. 8 is a side view of the recharging base station shown in FIG. 7.

FIG. 8 is a side view of the recharging base station 700. Hinge points 800 enable the cylindrical receptacle 712 to swivel about an axis extending between the hinge points 800, thereby enabling a flashlight 100 that is resting in the receptacle 712 and being recharged to be positioned at an angle that is convenient to a user. Support arms 810 support the cylindrical receptacle 712 above a base 815. The base 815 then can be mounted either horizontally, such as on a table or floor, or vertically, such as on a wall.

Figure 9:
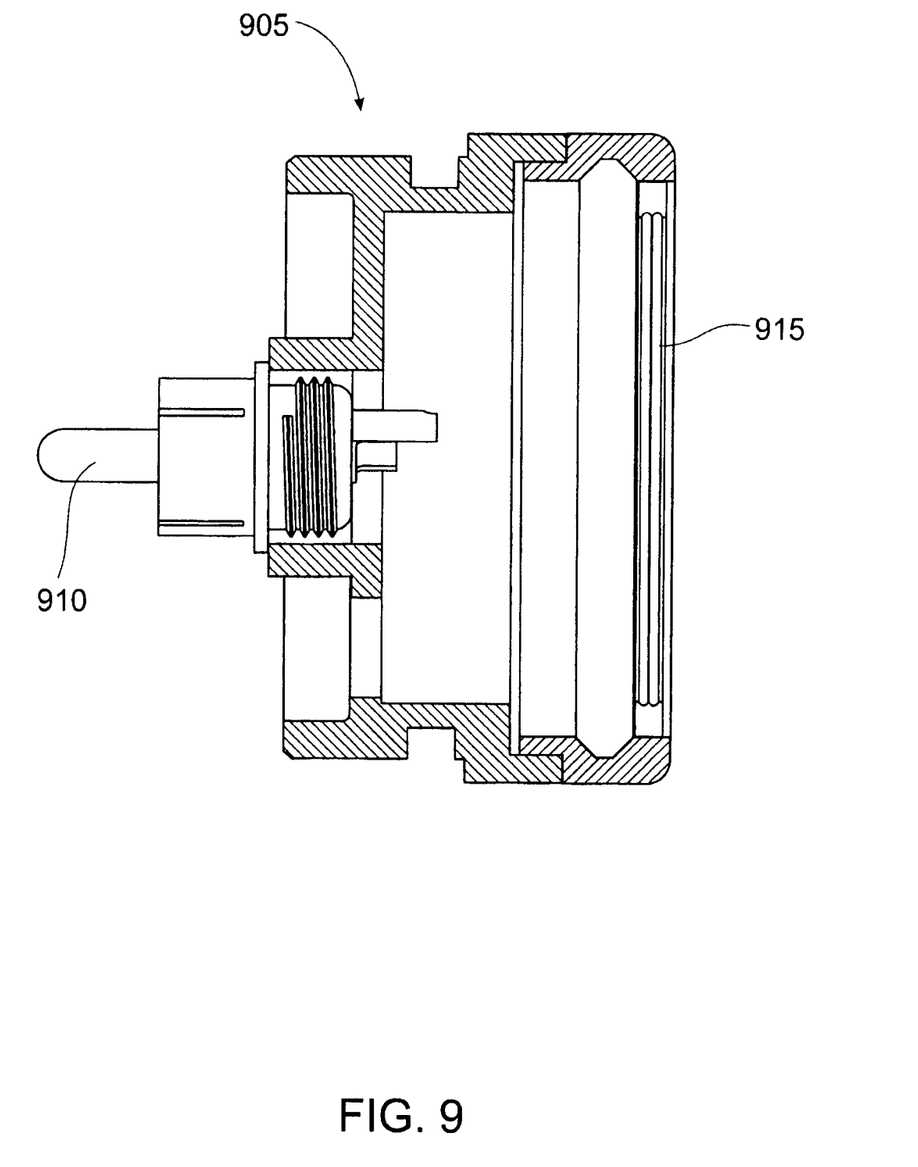
FIG. 9 is a side view of a tail cap, according to an alternative embodiment of the present invention.

FIG. 9 is a side view of a tail cap 905, according to an alternative embodiment of the present invention. As will be understood by those having ordinary skill in the art, many alternative embodiments of the tail caps 305, 405 are also encompassed by the teachings of the present invention. For example, the tail cap 905 includes a plug or jack-type coupling 910, such as a phono plug, between the tail cap 905 and a battery, rather than using the wires 315, 415. A negative connection to a flashlight housing then can include a conventional spring mounted at an end of the housing. The tail cap 905 also includes circuitry such as contacts 915 for electrically connecting, during recharging, the tail cap 905 to a base station, such as the recharging base station 700.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

I claim:

1. A method for converting a non-rechargeable flashlight so that it is rechargeable, the method comprising:
    providing a recharging base station comprising a base, and a receptacle configured to receive at least a portion of a replacement tail cap, the receptacle being rotatably connected to the base;
    removing an original tail cap from the flashlight;
    placing a rechargeable battery into a housing of the flashlight; and
    replacing the original tail cap with the replacement tail cap, wherein the replacement tail cap comprises circuitry for receiving electrical power from the recharging base station for recharging the rechargeable battery.

2. The method of claim 1, wherein the circuitry for receiving electrical power from the recharging base station comprises a secondary coil for receiving inductive power from a primary coil in the recharging base station.

3. The method of claim 1, wherein the circuitry for receiving electrical power from the recharging base station comprises external electrical contacts for establishing an electrical connection with corresponding external electrical contacts of the receptacle of the recharging base station.

4. The method of claim 1, wherein the housing and the original tail cap of the non-rechargeable flashlight are cylindrical.

5. The method of claim 1, wherein an external shape and configuration of the replacement tail cap is approximately the same as an external shape and configuration of the original tail cap.

6. The method of claim 1, wherein the rechargeable battery comprises a battery technology selected from the following: lead acid, lithium ion, lithium sulfur, lithium titanate, nickel cadmium, nickel iron, nickel hydrogen, nickel metal hydride, nickel zinc, and polysulfide bromide.

7. The method of claim 1, wherein the rechargeable battery comprises an integrated voltage converter.

8. The method of claim 1, wherein the replacement tail cap includes a jack-type coupling for electrically connecting the replacement tail cap to the rechargeable battery.

9. The method of claim 1, wherein the base of the recharging base station further comprises a pair of hinge points configured to swivel the receptacle about an axis extending between the hinge points.

10. The method of claim 1, wherein the base of the recharging base station further comprises a planar bottom, and a support leg extending from the base to define an opening between the planar bottom and the support leg, the planar bottom and the support leg are configured so as to rest on top of a flat surface.

11. The method of claim 2, wherein the secondary coil is in communication with the circuitry by a wire, the wire having a length allowing the replacement tail cap to be removed from the housing of the flashlight.

12. The method of claim 3, wherein the external electrical contacts are in communication with the circuitry by a wire, the wire having a length allowing the replacement tail cap to be removed from the housing of the flashlight.

13. The method of claim 9, wherein the hinge points are each located on a support arm extending from the base and configured to support the receptacle a distance from the base to define an opening between the receptacle and the base, the opening is configured to allow the receptacle to swivel in relation to the base.

14. The method of claim 13, wherein the receptacle is configured to receive therein the replacement tail cap and a portion of the housing of the flashlight.

15. The method of claim 14, wherein an internal shape and configuration of the receptacle is approximately the same as an external shape and configuration of the replacement tail cap.

* * * * *